US006810429B1

(12) United States Patent
Walsh et al.

(10) Patent No.: US 6,810,429 B1
(45) Date of Patent: *Oct. 26, 2004

(54) ENTERPRISE INTEGRATION SYSTEM

(75) Inventors: Thomas C. Walsh, Cambridge, MA (US); Michael J. Young, Boxborough, MA (US); Joseph J. DiCelie, Boylston, MA (US); David W. H. Wong, Boxborough, MA (US); Alan W. Esenther, Ashland, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/497,610

(22) Filed: Feb. 3, 2000

(51) Int. Cl.[7] .............................. G06F 15/16; G06F 9/00
(52) U.S. Cl. ........................................ 709/246; 719/328
(58) Field of Search ................................. 709/246, 218, 709/219; 707/3; 715/501.1; 719/328

(56) References Cited

U.S. PATENT DOCUMENTS

| 5,848,426 | A |   | 12/1998 | Wang et al. |   |
|---|---|---|---|---|---|
| 5,870,605 | A |   | 2/1999 | Bracho et al. |   |
| 5,940,075 | A |   | 8/1999 | Mutschler, III et al. |   |
| 5,996,012 | A |   | 11/1999 | Jarriel |   |
| 6,012,098 | A | * | 1/2000 | Bayeh et al. | 709/246 |
| 6,016,501 | A |   | 1/2000 | Martin et al. |   |
| 6,065,039 | A | * | 5/2000 | Paciorek | 709/202 |
| 6,178,461 | B1 | * | 1/2001 | Chan et al. | 709/247 |
| 6,192,370 | B1 | * | 2/2001 | Primsch | 707/103 R |
| 6,226,666 | B1 | * | 5/2001 | Chang et al. | 709/202 |
| 6,233,601 | B1 | * | 5/2001 | Walsh | 709/202 |
| 6,253,239 | B1 | * | 6/2001 | Shklar et al. | 709/217 |
| 6,334,146 | B1 | * | 12/2001 | Parasnis et al. | 709/217 |
| 6,336,124 | B1 | * | 1/2002 | Alam et al. | 715/523 |

(List continued on next page.)

FOREIGN PATENT DOCUMENTS

| EP | 1 030 254 | 8/2000 | |
|---|---|---|---|
| EP | 1122652 A1 | * 8/2001 | ........... G06F/17/30 |
| WO | WO 99/23584 | 5/1999 | |

OTHER PUBLICATIONS

Vermeulen, C. et al., "Software agents using XML for Telecom service modelling: a practical experience", Proceedings of SGML/XML Europe '98, pp. 253–262, May 1998.*

(List continued on next page.)

*Primary Examiner*—Jason D. Cardone
(74) *Attorney, Agent, or Firm*—Dirk Brinkman; Andrew J. Curtin

(57) ABSTRACT

An enterprise integration system is coupled to a number of legacy data sources. The data sources each use different data formats and different access methods. The integration system includes a back-end interface configured to convert input data source information to input XML documents and to convert output XML document to output data source information. A front-end interface converts the output XML documents to output HTML forms and the input HTML forms to the XML documents. A middle tier includes a rules engine and a rules database. Design tools are used to define the conversion and the XML documents. A network couples the back-end interface, the front-end interface, the middle tier, the design tools, and the data sources. Mobile agents are configured to communicate the XML documents over the network and to process the XML documents according to the rules.

21 Claims, 10 Drawing Sheets

U.S. PATENT DOCUMENTS

| | | | | |
|---|---|---|---|---|
| 6,345,259 | B1 * | 2/2002 | Sandoval | 705/7 |
| 6,356,905 | B1 * | 3/2002 | Gershman et al. | 707/10 |
| 6,397,232 | B1 * | 5/2002 | Cheng-Hung et al. | 715/523 |
| 6,401,132 | B1 * | 6/2002 | Bellwood et al. | 709/246 |
| 6,424,979 | B1 * | 7/2002 | Livingston et al. | 715/511 |
| 6,446,110 | B1 * | 9/2002 | Lection et al. | 709/203 |
| 6,480,860 | B1 * | 11/2002 | Monday | 707/102 |
| 6,513,059 | B1 * | 1/2003 | Gupta et al. | 709/202 |
| 6,519,653 | B1 * | 2/2003 | Glass | 719/317 |
| 6,585,778 | B1 * | 7/2003 | Hind et al. | 715/513 |
| 6,678,715 | B1 * | 1/2004 | Ando | 718/105 |
| 2003/0037181 | A1 * | 2/2003 | Freed | 709/328 |
| 2003/0120639 | A1 * | 6/2003 | Potok et al. | 707/3 |

OTHER PUBLICATIONS

Samaras, G. et al., "Mobile agent platforms for Web databases: a qualitative and quantitative assesment", IEEE Symposium on Agent Systems and Applications, pp. 50–64, Oct. 1999.*

Walsh, T. et al., "Security and reliability in Concordia", IEEE Conference on System Sciences, vol. 7, pp. 44–53, Jan. 1998.*

Microsoft Corporation, "MS Biz Talk Server: Whitepaper", www.microsoft.com/technet/treeview/default.asp?url/technet/prodtechnol/biztalk/biztalk2000/evaluate/bizorch.asp, May 1999.*

Ouahid, H. et al., "Converting Web pages into well–formed XML documents", IEEE Conference on Communications, vol. 1, pp. 676–680, Jun. 1999.*

Peng Fu B. Eng, "A security architecture for mobile agent system", master of science thesis, www.citeseer.nj.nec.com/586334.html, published by University of British Columbia, Oct. 2001.*

"Microsoft Announces Finalized BizTalk Framework"; Microsoft PressPass, Dec. 6, 1999; <www.microsoft.com/PressPass/press/1999/Bixtalk1. Opr.asp>.

Ludo Van Vooren, "XML and Legacy Data Conversion: Introducing Consumable Documents"; SGML Europe '97. Conference Proceedings.

* cited by examiner

ENTERPRISE INTEGRATION SYSTEM

FIELD OF THE INVENTION

This invention relates generally to computerized applications, databases, and interface, and more particularly to integrating applications, databases, and interfaces having different formats, contexts, and designs.

BACKGROUND OF THE INVENTION

Computer and computer-related technology have enabled the use of computers in numerous enterprise functions. Almost every facet of a modern enterprise is supported by computer systems in some manner. Computerization is a necessity to allow an enterprise to remain functional and competitive in a constantly changing environment.

Computer systems are used to automate processes, to manage large quantities of information, and to provide fast and flexible communications. Many enterprises, from sole proprietorships, small stores, professional offices and partnerships, to large corporations have computerized their functions to some extent. Computers are pervasive, not only in business environment, but also in non-profit organizations, governments, and educational institutions.

Computerized enterprise functions can include billing, order-taking, scheduling, inventory control, record keeping, and the like. Such computerization can be accomplished by using computer systems that run software packages. There are many application software packages available to handle a wide range of enterprise functions, including those discussed above.

One such package is the SAP R/2™ System available from SAP America, Inc., 625 North Governor Printz Blvd., Essington, Pa. 19029. The SAP R/2 System is a software package designed to run on IBM or compatible mainframes in a CICS (Customer Interface Control System) or IMS (Information Management System) environment. For example, SAP may use CICS to interface with user terminals, printers, databases, or external communication facilities such as IBM's Virtual Telecommunications Access Method (VTAM).

SAP is a modularized, table driven application software package that executes transactions to perform specified enterprise functions. These functions may include order processing, inventory control, and invoice validation; financial accounting, planning, and related managerial control; production planning and control; and project accounting, planning, and control. The modules that perform these functions are all fully integrated with one another.

Another enterprise area that has been computerized is manufacturing. Numerous manufacturing functions are now controlled by computer systems. Such functions can include real-time process control of discrete component manufacturing (such as in the automobile industry), and process manufacturing (such as chemical manufacturing through the use of real-time process control systems). Directives communicated from the computer systems to the manufacturing operations are commonly known as work orders. Work orders can include production orders, shipping orders, receiving orders, and the like.

However, the computerization of different functions within a single enterprise has usually followed separate evolutionary paths. This results in incompatibility between the different systems. For example, transactions from a system for one function may have a context and a format that are totally incompatible with the context and format of another function. Furthermore, as enterprises grow through mergers and acquisitions, the likelihood of inheriting incompatible systems increases. Consequently, the legacy systems cannot provide all the information necessary for effective top level management and control.

As an additional complexity, enterprise systems need user interfaces for front-end operations. For example, in the healthcare industry, administrative staff and health care providers need reliable access to patient records. If the healthcare enterprise has evolved by a series of mergers, the possibility of a reception desk populated with half a dozen different terminals, each accessing a different patient database and a different accounting system is a certainty, and service and profitability suffers.

Generic computerized solutions that offer an efficient, automated way to integrate an enterprise's various computerized systems are difficult to implement. Another conventional solution is to implement a custom, computerized interface between the various systems. However, these custom solutions are usually tailored to a specific enterprise environment. As a result, the tailored solutions are not portable into other situations without major modifications. Additionally, these solutions are costly to maintain over time because of inherent difficulties in accommodating change.

Conventional solutions that meet all of the needs for collecting, retrieving, and reporting data in a complex enterprise do not exist. For example, the DASS™ system, available from a SAP AG, of Waldorf, Germany, is intended to automate manufacturing functions. DASS receives information from SAP R/2 package described above. However, DASS does not appear to provide a generic solution to connect a computerized business system to a computerized manufacturing system.

FIG. 1a shows an example legacy enterprise system 10. The legacy system includes as subsystems a SAP system 11, an Oracle™ database 12, one or more legacy applications 13, Lotus Notes™ 14, a Web server 15, and user interfaces 20. The system 10 might also permit access to some functions by a mobile computer (laptop) 30 via a dial-up communications link 40.

More than likely, the legacy system 10 will exhibit one or more of the following problems. All sub-systems cannot communicate with every other sub-system because each sub-system has its own application programming interfaces (APIs). Real-time data interchange among all of the sub-systems may be impossible or extremely difficult because each sub-system stores and views data in a different way and uses different communication protocols. Modified enterprise functions or adding automation for new functions is expensive. Each sub-system is developed with its own peculiar programming language. Users cannot always access all the data all of the time, particularly when the user is mobile. It is difficult to provide top level management with an abstraction of all system information.

What is needed is a system that can integrate various computer systems in an enterprise. The system needs to be able to convey transactional data between any number of databases regardless of their format, context, and access methodology. User interfaces to the databases need to be uniform. In addition, as enterprise functions change, new procedures and transactions must be accommodated in a minimal amount of time without having to redesign and reimplement any of the functional systems. The ideal enterprise integration system should be capable of adapting to any number of computerized functions in a modern complex enterprise.

SUMMARY OF THE INVENTION

The present invention is directed to a system and method for integrating computer systems found in many types of enterprises.

An enterprise integration system is coupled to a number of legacy data sources. The data sources each use different data formats and different access methods. The integration system includes a back-end interface configured for converting input data source information to input XML documents and for converting output XML documents to output data source information.

A front-end interface converts the output XML documents to output HTML forms and the input HTML forms to the XML documents. A middle tier includes a rules engine and a rules database. Design tools are used to define the conversion and the XML documents.

A network couples the back-end interface, the front-end interface, the middle tier, the design tools, and the data sources. Mobile agents are configured to communicate the XML documents over the network and to process the XML documents according to the rules.

DETAILED DESCRIPTION OF THE PREFERRED EMBODIMENTS

Introduction

Figure 1A:
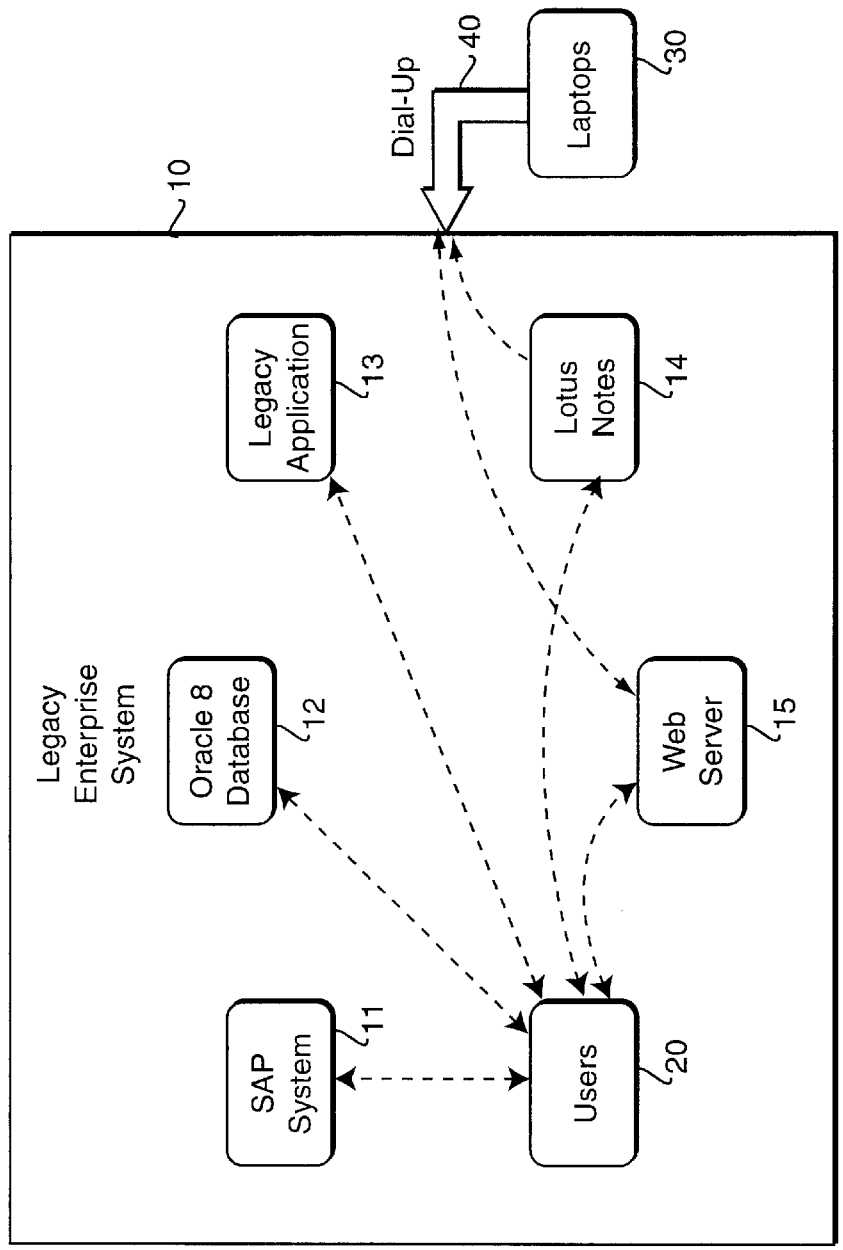
FIG. 1a is a block diagram of a legacy enterprise system.

Our invention provides a robust and scalable environment for integrating legacy enterprise computer systems. The invention integrates databases, transactions, and user interfaces having different formats, contexts, and designs, such as the sub-systems shown in FIG. 1a. We also provide for automated rules based processing.

At the core of our integration system, we utilize XML as a universal data encoding and interchange format. XML (Extensible Markup Language) is a flexible way for us to create common information formats and share both the format and the data on the Internet, the World Wide Web (WWW), intranets, and private local area network. XML, developed by the World Wide Web Consortium (W3C), is "extensible" because, unlike HyperText Markup Language (HTML), the markup symbols of XML are unlimited and self-defining. XML is actually a simpler and easier-to-use subset of the Standard Generalized Markup Language (SGML), the standard for how to create a document structure. XML enables us to create customized "tags" that provide functionality not available with HTML. For example, XML supports links that point to multiple documents, as opposed to HTML links, which can reference just one destination each. These basic interfaces allow our integration system to view, modify and interact with linked legacy applications or legacy data sources.

System Architecture

Figure 1B:
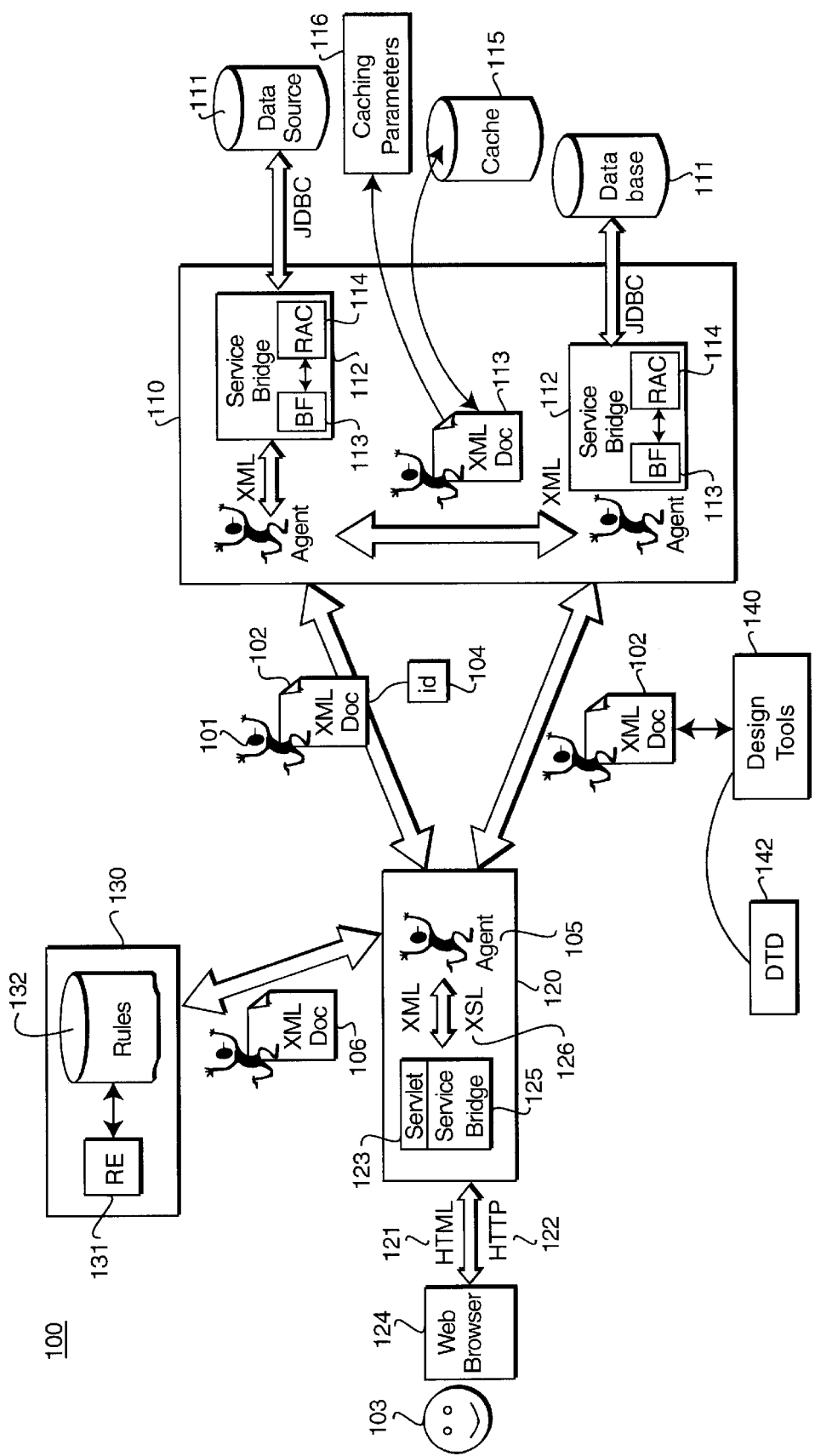
FIG. 1b is a block diagram of an integrated enterprise system according to the invention.

As shown in FIG. 1b, our enterprise integration system 100 includes the following main components: a back-end interface 110, a front-end interface 120, a middle tier 130, and design tools 140. The components are connected by a network and mobile agents 101 carrying XML documents 102. The mobile agents 101 are described in greater detail in U.S. patent application Ser. No. 08/965,716, filed by Walsh on Nov. 7, 1997, incorporated herein in its entirety by reference. As a feature, the agents can travel according to itineraries, and agents can "meet" with each other at meeting points to interchange information.

With our back-end interface 110, we enable read/write/modify access to existing (legacy) applications and data sources 111. The back-end interface maps (or translates) data from legacy formats into the XML format used by our enterprise integration system 100.

The front-end interface 120 enable us to present information to users 103 using standard presentation methodologies. The front-end interface also allows the user to modify information and to generate transactions to initiate enterprise processes or workflow. The front-end interface can be modified to meet changing requirements of the enterprise.

The middle tier 130 uses our mobile agents 101 to provide an infrastructure for highly flexible, robust and scaleable distributed applications. The middle tier combines server technology with a customizable business rules engine and an application framework. The middle tier also provides for the deployment of disconnected applications for mobile users. That is, the middle tier allows the mobile user to perform tasks while disconnected from the system 100.

The design tools 140 support the definition of XML document formats. The design tools also allow us to define mappings of the XML document formats and the legacy data formats, and to provide for the automated generation of forms for user presentation via the front-end interface. These components are now described in greater detail.

Back-End Interface

The back-end interface 110 is composed of one or more service bridges 112. The service bridges provide highly efficient access to various legacy systems. Hereinafter, we will frequently call the legacy systems "data sources" 111. We do not care how the legacy systems are programmed, or how their applications are structured. That is, the back-end interface of our integration system provides a generic and uniform access interface to the highly diverse legacy systems without requiring special knowledge of internal, legacy interfaces of the linked systems.

Semantically, we model the back-end interface as an XML document publishing and management system. We see the data source as "publishing or "serving" XML documents containing enterprise information. The back-end allows users to add, update, delete, browse, and search for documents in the data source. We chose this semantic model of interaction because it provides a generic interface through which many disparate legacy systems can be accessed.

A particular data source 111 can manage multiple types of documents, such as customer accounts, purchase orders, work items, work lists, and the like. Any document in any data source can be uniquely identified and retrieved by a document identification (id) 104. In our implementation, and keeping within the spirit of XML, we use a document identification 104 that is conceptually similar to a Web page Universal Resource Locator (URL), although different in detail. As shown, the service bridges include a bridge framework (BF) 113 and a data source-specific runtime access component (RAC) 114. The service bridge is described in greater detail below with reference to FIGS. 4–9.

Bridge Framework

The bridge framework 113 provides generic high level access services for the back-end interface. The framework is relatively independent from the specifics of the linked legacy systems and is implemented with reusable code. The bridge framework performs user authentication, and identifies the user making a request of the data source. The bridge framework also identifies agents 101 making requests, and provides a means to map a generic user identity to specific "logon" information required by any of the legacy data sources, e.g., a username and a password. The bridge framework operates securely such that any sensitive datasource logon information, such as a clear-text password, is encrypted.

Connection Pooling and Document Management

The framework also manages objects involved in establishing and maintaining a connection to the data source, and provides for connection sharing and pooling. Connection pooling and sharing is used when the establishment of a connection or session with the data source is too expensive to perform on a per user basis. The connection pooling and sharing mechanism is based on "user groups." All members of a user group access a particular data source via a shared connection pool. The connections in this pool are established within the user context of a "pseudo-user account."

A pseudo-user account is a special data source account that represents a group of users instead of an individual user. Thus, if we have two user names, "john@accounting" and "jim@accounting," the two accounting users both access the data source within the context of the accounting pseudo user account. Connection pooling may not be necessary for all back-end data sources, but certainly is required for relational database access.

Document Caching

The bridge framework also provides a tunable caching facility to increase system performance. As stated above, a primary function of the back-end interface is to access legacy data and convert that data into the XML format. The bridge framework maintains XML documents in a cache 115 so that a subsequent request to retrieve the same data can bypass any data access or conversion work overhead by accessing the cached XML document.

The caching in our system is tunable. For a given type of document, a system administrator can specify caching parameters 116 such as whether caching should be enabled, a maximum lifetime before cache entries become stale, a maximum cache size, whether the cache 115 should be a persisted disk and re-used at next server startup. For document types that contain highly volatile data, caching can be disabled or cache entries can be set to expire quickly. For documents containing data that changes rarely, the caching parameters can be set aggressively to retain the documents in the cache.

Runtime Access Component

The runtime access component (RAC) 114 is specific for a particular data source 111. The RAC uses application programming interfaces (APIs) and structures of the legacy data source to access the data and to map the data into the XML format. The exact semantics of how the data are mapped to the XML format vary. For example, the mapping can be for widely used legacy databases, such as, JDBC, JDBT, SAP, or SQL. An example JDBC implementation is described below with reference to FIG. 4. The RAC supports the following database access operations.

Query

The "query" operation retrieves a document from the data source. The caller supplies the id 104 of the document to fetch. The bridge service returns the specified information in the form of a XML document according to one of the standard programming models supported by W3C, for example, a DOM document object or a SAX document. DOM (Document Object Model), is a programming interface specification that specifies a tree which applications may then explore or modify. SAX is an event-based tool, more or less 'reading' the document to the application using a set of named methods to indicate document parts. SAX is typically used where efficiency and low overhead are paramount, while the DOM is used in cases where applications need random access to a stable tree of elements. The interface allows us to generate and modify XML documents as full-fledged objects. Such documents are able to have their contents and data "hidden" within the object, helping us to ensure control over who can manipulate the document. Document objects can carry object-oriented procedures called methods.

In the case of a relational database, the query operation maps to a SQL SELECT statement with a WHERE clause specifying which record or records from the database are contain in the document.

Update

The "update" operation modifies existing data in the legacy data source. The caller supplies the id of the document and a XML document containing only the fields to be modified. In the case of the relational database, the update operation maps to a SQL UPDATE statement.

Delete

The "delete" operation removes a document from the data source. The caller supplies the id of the document to delete. In the case of the relational database, the delete operation maps to a SQL DELETE statement.

Add

The "add" operation inserts a new document into the data source. The caller supplies the document in the form of a DOM Document object. The bridge service returns the id of the newly added document. In the case of a relational database, the add operation maps to a SQL INSERT INTO statement.

Browse

The browse operation, also known as "buffering," browses all of the documents in the data source of a certain type. The caller supplies the type of document to browse. The bridge service returns a browse object similar to a JDBC result set. The browse object allows the caller to traverse the results in either direction, jumping to the first or last document, and to re-initiate the browse operation. In the case of a relational database, the browse operation maps to a SQL SELECT statement that returns multiple records.

Search

The search operation browses the data source for all documents of a certain type that meet a predefined search criteria. The search criteria can be a list of fields and values which the caller wants to match against records in the database. For example, the caller might request all customer records that contain a "state" field matching the string "MA." The caller supplies the type of document to browse as well as a document containing the fields to be matched. The bridge service returns a browse object as above. In the case of a relational database, the search operation maps to a SQL SELECT statement in which the WHERE clause contains the LIKE operator.

Front-End Interface

The front-end interface 120 is responsible for user presentation and interaction. The front-end interface uses "forms" to allow users to view and modify information. As an advantage, the front-end interface provides a "thin" user interface, with simple interactivity that can easily be customized as the environment in the enterprise changes. The front-end forms use HTML 121, HTTP 122, Javascript, Java servlets 123, Java applets, and plug-ins as necessary. Being Web based, the user 103 can use any standard browser 124 to interact with the system from anywhere there is an Internet access point.

HTTP Communications

The HTTP is used as the communication mechanism between agents and users. The user 103 browses and modifies information, and initiates processes via the web browser 124. User requests are routed to agents 101 via HTTP and through the Java servlet. The servlet 123 in turn communicates with a front-end service bridge 125 that serves as an interface for the agents 101.

The servlet/service bridge combination 123/124 supports the establishment of user sessions that are the channel for two-way communication between the user and the agents. Within the context of a session, the user can send HTTP GET or POST requests to the agents, and the agents process such requests, and send back an HTTP response. Sessions allow the user to wait for an agent to arrive and allow an agent to wait for a user to connect.

HTML Form Style Sheets

We accomplish the display of information to users with HTML, web pages, and web forms. As stated above, the information that agents retrieve from data sources is in the form of the XML documents 102. To format the XML documents into a form suitable for users, the front-end servlet 123 converts the XML document to a HTML page using a style sheet 126, e.g. XSL, JSP or some other data replacement technique as described below. The result of this conversion is the HTML page containing the information in a user-friendly format. By applying the style sheet, the servlet recognizes and replaces certain data from the XML document and converts the data to HTML form.

For example, a particular XML document 102 includes the following information:

```
<customer>:
    <firstname>John</firstname>
    <lastname>Smith</lastname>
</customer>
```

The HTML style sheet 126 for this document is as follows:

```
<html>
    <h1>'customer.firstname'</h1>
    <h2>'customer.lastname'</h2>
</html>
```

After applying the style sheet to the XML document, the resultant HTML form 121 would appear as:

```
<html>
    <h1>John</h1>
    <h2>Smith</h2>
</html>
```

The style sheet supports accessing all of the elements and attributes in the XML documents, and iteration over groups of repeating elements.

For example, an XML document contains:

```
<customer type="preferred">
    <firstname>John</firstname>
    <lastname>Smith</lastname>
</customer>
```

The "type" attribute of the customer is accessed by using a syntax such as the following:

'customer.attr[type]' which yields the value "preferred." Given a document containing repeating groups as follows:

```
<customers>
    <customer type="preferred">
        <lastname>Smith</lastname> </customer>
    <customer type="standard">
        <lastname>Jones</lastname>
</customer>
```

The "lastname" element of the second customer is accessed using a syntax such a 'customer[1].lastname' which yields the value "Jones." To iterate over all of the customers and access their "type" attributes, an expression such as:

```
'iterate(i=customers.customer) {
    i.attr[type]
``` can be used to produce first the string "preferred," and then "standard."

Validation

The front-end interface also supports the validation of user entered information. Field validation information supplies some immediate feedback and interactivity to the user. Field validation also increases application efficiency by detecting common errors within the web browser process before any other network traffic is incurred or application logic is executed. Client side validation can be broken down into two related levels.

Field-Level

Field-level validation performs simple checks on user entered data to validate that the information is of the correct format or data type. For example, field-level validation can validate that a user enters numeric values in a particular field, or uses a proper date format. We implement field-level validations with Javascript. A library of common validations is supplied as a script file on a web server. The library has a ".js" file extension. This script file can be included into HTML forms as desired using the <script> HTML tag. Validation is enabled for a field by indicating the name of an appropriate validation routine, e.g. "onChange," within an event handler of the field. The event handler is triggered when an INPUT field changes. Setting up validation for a field requires HTML coding as follows:

```
<input type="text" name="birthdate" onChange="validateDate-
    (birthdate)">
```

The validation library provides routines for common data types such as dates, times, currency, etc. The validation library can also provide a pattern matching ability allowing user input to be matched against arbitrary patterns, e.g., a pattern $##.## to match a monetary amount.

Cross-Field Validation

Cross-field validation allows for more complex validations. In this type of validation, the contents of one field depends on the contents of another field. For example, cross-field validation can detect a situation where a telephone number must be entered. Such validation usually requires a more detailed knowledge of the requirements of the application.

Middle Tier

The middle tier 130 provides the "glue" that links the back-end and the front-end interfaces. The middle tier utilizes the mobile agents 101 to communicate with the interfaces. The middle tier also provides support for disconnected applications and users. In addition, the middle tier customizes the system 100 to the needs of specific enterprise functions without actually having to reprogram the legacy systems.

The middle tier supports the automation of complex workflow and complex validations of data that may require access to multiple data sources. As a feature, the middle tier uses a rules engine (RE) 131 operating on rules stored in a database 132. The rules are defined in a rules language, and can be retrieved by the agents 101 as needed.

In a typical scenario, the user launches an agent 105 due to interaction with the browser 124. The agent carries an XML document, e.g., a purchase order 106, to the rules database 132. The agent retrieves the appropriate rule for processing the order, such as a purchase order workflow. The agent then interprets the rule to appropriately route the document to the locations in the network specified by the rule. The rule can include a travel itinerary, as well as instructions on how to interact with the data sources.

As an advantage, the operation of our system is always current. As rules change so does the operation of the system. The agents always execute according the current state of the rules database.

Design Tools

Figure 2:
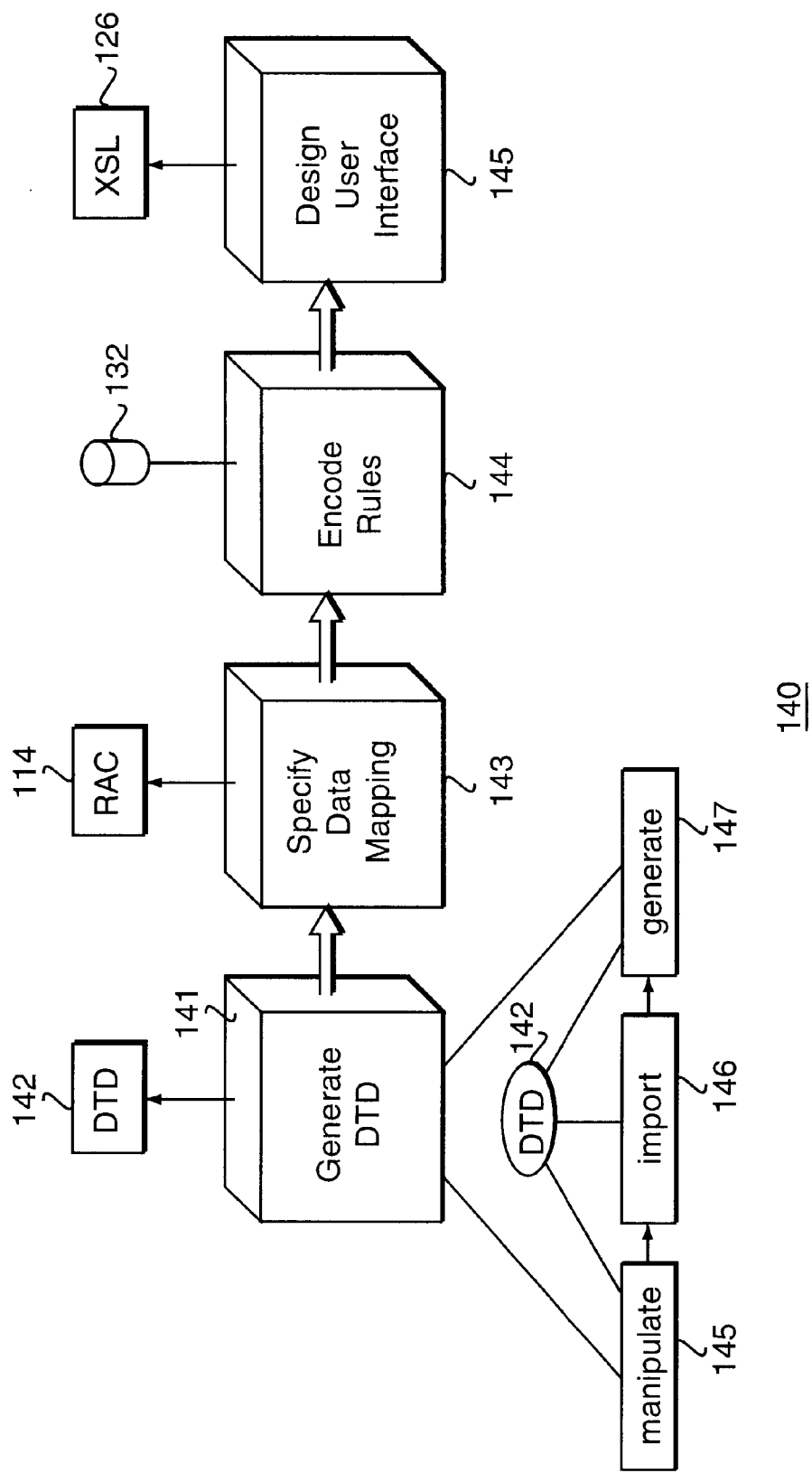
FIG. 2 is a block diagram of design tools used by the system of FIG. 1b.

As shown in FIG. 2, the primary purpose of the design tools 140 is to generate 141 XML document type definitions (DTD) 142, to specify 143 data mappings, i.e., RACs 114, to encode 144 rules 132, and to design 145 user interfaces 126.

Document Type Definitions

The step 141 identifies the different types of document information (DTD) 142 that needs to be shared by the various data sources 111 of the back-end 110 and the browser 124 of the front-end 120. This information is specified in the DTDs. For example, to share purchase order information between systems, the type of information needed in a purchase order needs to be identified, then that information needs to be encoded in a corresponding DTD. In one embodiment, the design tools use the service bridge to extract schemas from the data sources.

Data Mapping

Figure 3:
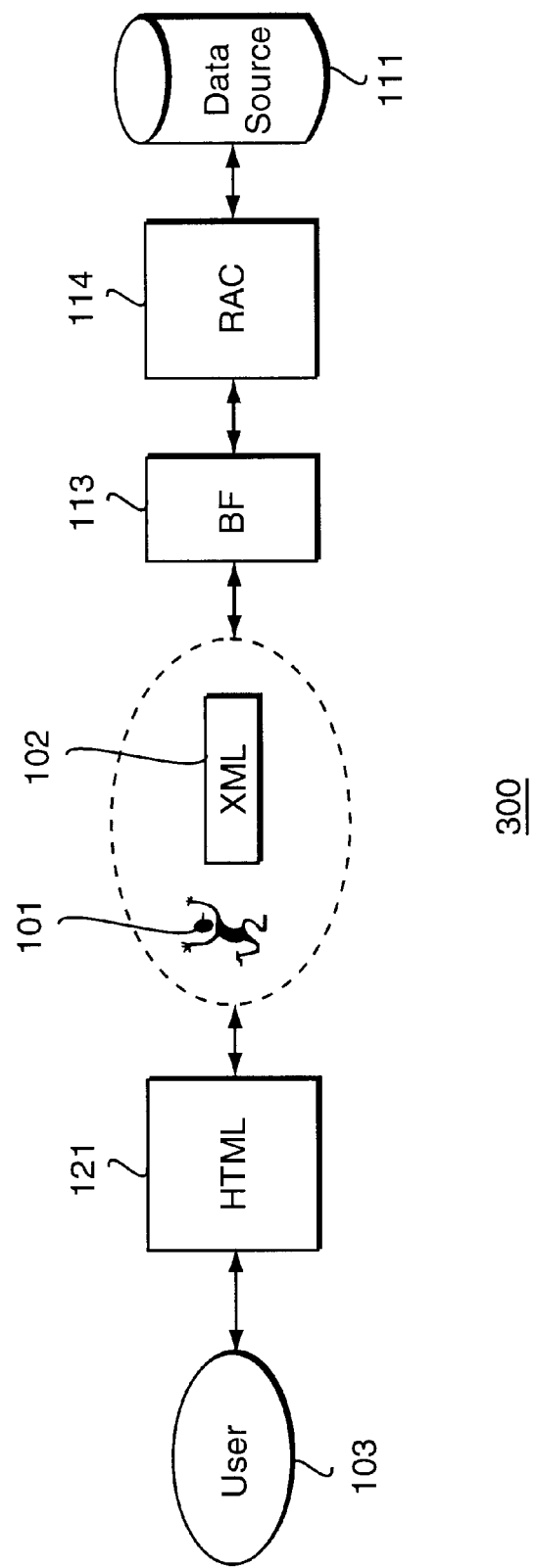
FIG. 3 is a block diagram of XML data accesses according to the invention.

After a data source independent data format has been generated, the mappings between the XML format and legacy formats for a particular database needs to be specified as shown in FIG. 3. A query operation to a relational databases 111 involves extracting the schema of the database by generating a SQL runtime access component (RAC) 114 which makes the JDBC calls to the database, converting the resulting data into the XML format, and handing the XML document 113 to an agent 101. The access components can be implemented as Java code. The agent delivers the XML to the front-end 120 for conversion to the HTML form 121 using the style sheet 126 so that the data can be viewed by the user 103 using a standard browser 124.

Conversely, the update operation converts the HTML form to the corresponding XML document. The XML document is converted to a legacy format and the RAC modifies the data source using its schema. For other legacy data sources that are not specified by a schema or some other metadata, the mapping may need to be done by means that access the APIs directly.

Rule Encoding

After the data format definition is generated, and the RAC has been specified to access the appropriate data source, the next step is to encode what agents are going to do with the information. In a simple data replication system, an agent may retrieve modified records from a master database, travel to the location of a backup database, and then update the backup database with a copy of the modified record. This process involves the encoding of a specific rule.

Designing the User Interface

As shown in FIG. 2, generating the user interface requires three steps: manipulating document type definitions (DTD) 145, importing DTD 146, and generating DTD from database schema 147.

Authoring DTD

The design tools 140 allow the system designer to define, design, and manipulate XML and HTML DTDs. A DTD 142 defines the name of the following document elements: the contents model of each element, how often and in which order elements can appear, if start or end tags can be omitted, the possible presence of attributes and their default values, and the names of the entities.

Because the DTDs represent many different types of documents in the system, this step essentially defines the data types of the enterprise's computerized applications. As an advantage, the resulting DTDs do not directly tie the system to any specific legacy data source, nor do the definitions preclude the integration of other legacy systems in the future.

DTD Import

The tools also allow one to import already existing DTD definitions. Such functionality can be used in environments where DTDs have already been defined for standard document types. These DTDs may have been defined by standards bodies or a designer of the legacy system.

DTD generation from Database Schema

This part of the tools automatically generate DTDs from existing database schema.

XMLΘ→SQL Mapping Definition

Given the existence of the DTDs, the system 100 provides tools that map between legacy back-end data formats and XML document formats. In the case of relational database access, these mappings link tables, columns, and fields from the legacy database to elements and attributes of the XML documents as defined by the DTDs. This also allows the definition of several distinct mappings, each of which involves accessing slightly different information in the data source.

Data Mappings

Query Mapping

A query mapping enables an agent to retrieve information from a legacy data source. In the case of a relational database, this mapping specifies the contents of the SELECT statement, including any information relevant for a table join. A query mapping for a purchase order may involve accessing a purchase order table, a customer table, and a product catalog table.

Update Mapping

An update mapping allows an agent to modify information in the data source. This involves specifying the contents of an UPDATE statement. An update mapping for a purchase order involves updating the purchase order table, but not modifying the customer table or the product catalog table.

Delete Mapping

A delete mapping allows an agent to delete information in the data source. This involves specifying the contents of a DELETE statement. A delete mapping for a purchase order involves deleting a record or records from the purchase order table, but not modifying the customer table or the product catalog table.

Add/Create Mapping

An add/create mapping allows an agent to add information to the data source. This involves specifying the contents of an INSERT statement. An insert mapping for a purchase order involves adding a record or records to the purchase order table, but not modifying the customer table or the product catalog table.

Schema Extraction and Caching

In order to allow for mapping between a legacy database schema and XML DTD formats, the mapping design tool extracts the schema from legacy databases. Because schema extraction is an expensive and time consuming task, the tools allow one to save extracted schemas on a disk for subsequent use.

Form Generation

The tools will also allow one to automatically generate a form from a DTD. Such a form may require minor modifications to enhance the physical appearance of the form. For example, color or font size of text can be adjusted to enhance usability.

Embedding Binary Data in XML Documents

Some enterprise applications may need to retrieve arbitrary binary data from the data source 111. For example, a legacy database contains employee information. Included with that information is a picture of the employee in standard JPEG format. The employee information is stored as a single table named "employees," which has a schema as Table 1, where the field <image> represents the picture:

TABLE 1

| ID | Name | HireDate | Photo |
| --- | --- | --- | --- |
| 1 | John Smith | 1/1/96 | <image> |

The XML document that retrieves the above table appears as follows:

```
<employee>
    <ID>1<1</ID>
    <name>john Smith</name>
```

-continued

```
    <hiredata>1996-29</hiredata>
</employee>
```

XML, by itself, does not naturally lend itself to the inclusion of binary data. To deliver this information for display in a web page, the service bridge 112 could encode the SQL record in an XML document as follows:

```
<employee>
    <ID>1<1</ID>
    <name>john Smith</name>
    <hiredata>1996-29</hiredata>
    <Photo href="http://server/directory/john.jpeg" />
</employee>
```

However, there are a number of problems with this type of approach. First, it is the responsibility of the user to issue the proper additional commands to retrieve the linked document before it can be displayed, e.g., the user must click on the URL of the picture. Second, the DTD for the XML document must specify the URL. For most legacy databases, it is unlikely that the records storing the binary data are accessible via an HTTP URL. Furthermore, the binary data is transported through the system by a follow on transport, such as HTTP. For reliability, security, consistence, and other reasons we prefer to carry all data, including binary data with the agents.

To allow the servlet 123 to generate an agent that can access the binary data, we define a new type of URL. The new URL incorporates the location of the binary data, as well as a unique "name" that can be used to retrieve the binary data. The URL contains the hostname of the data source, a service name, an action name that can be used to perform the retrieval of the binary data, and a document identification referring to the binary data. This still results in a fairly complex URL.

Using multiple requests to retrieve the binary data is inconsistent with our agent model. Agents try to use the network effectively by batching data into fairly large self-contained packets. This is very different than the hypertext model used on the web in which a single page display can lead to multiple network requests.

Compound Documents

In an alternative solution, we define a compound document. In a compound document, the binary data is embedded in the same document as the textual XML data. This approach is consistent with our agent driven system that attempts to transport data as larger batches. Compound documents can be built in two ways.

Embed Binary Data into XML Text Element

The binary data is embedded directly into an XML text element. This can be done as long as the binary data is encoded in such a way that the data only contain XML characters. Such an encoding could be based on the Base64 encoding. With Base64, special characters, such as "<" and ">," are replaced with equivalent entities (i.e., < and >). We also can use a character data (CDATA) section to work around the problem of illegal characters within the Base64-encoded data. We may want to prefix the embedded binary data with standard mime headers that specify content type, encoding, and name. Such a format for the photo element appears as follows:

```
<Photo>
    Content-Type: image/jpeg
    Content-Encoding: base64
    Content-Name: john.jpeg
    9j/4AAQSkZJ......gEASABIAAD/
</Photo>
```

It should be noted that this alternative increases the size of the binary data by 33% as well as increasing the overhead to encode and decode the data.

This alternative requires that a SQL RAC extracts the binary data and encodes the data into Base64, and then adds the encoded data to the XML document with the proper mime headers.

Compound Document Encoded as Mime Document

Another alternative, embeds both the XML document and the binary data into separate parts of a multipart mime document. Each part of the overall document has a Content-ID which is referenced from a standard XML link, in part, such a format appears as follows:

```
Content-Type: multipart/related; boundary"∂--XXXXX"
--XXXXX
Content-Type: text/xml
Content-ID: doc
    <Photo href="cid:photo"/>
--XXXXX
Content-Type: image/jpeg
Content-Encoding: base64
Content-Name: john.jpeg
Content-ID: photo
9j/4AAQSkZJ... gEASABIAAD/
----XXXX----
```

With this alternative, the binary data may not need to be encoded. However, this requires that agents also retrieve MIME documents via the RAC.

JDBC Service Bridge

Figure 4:
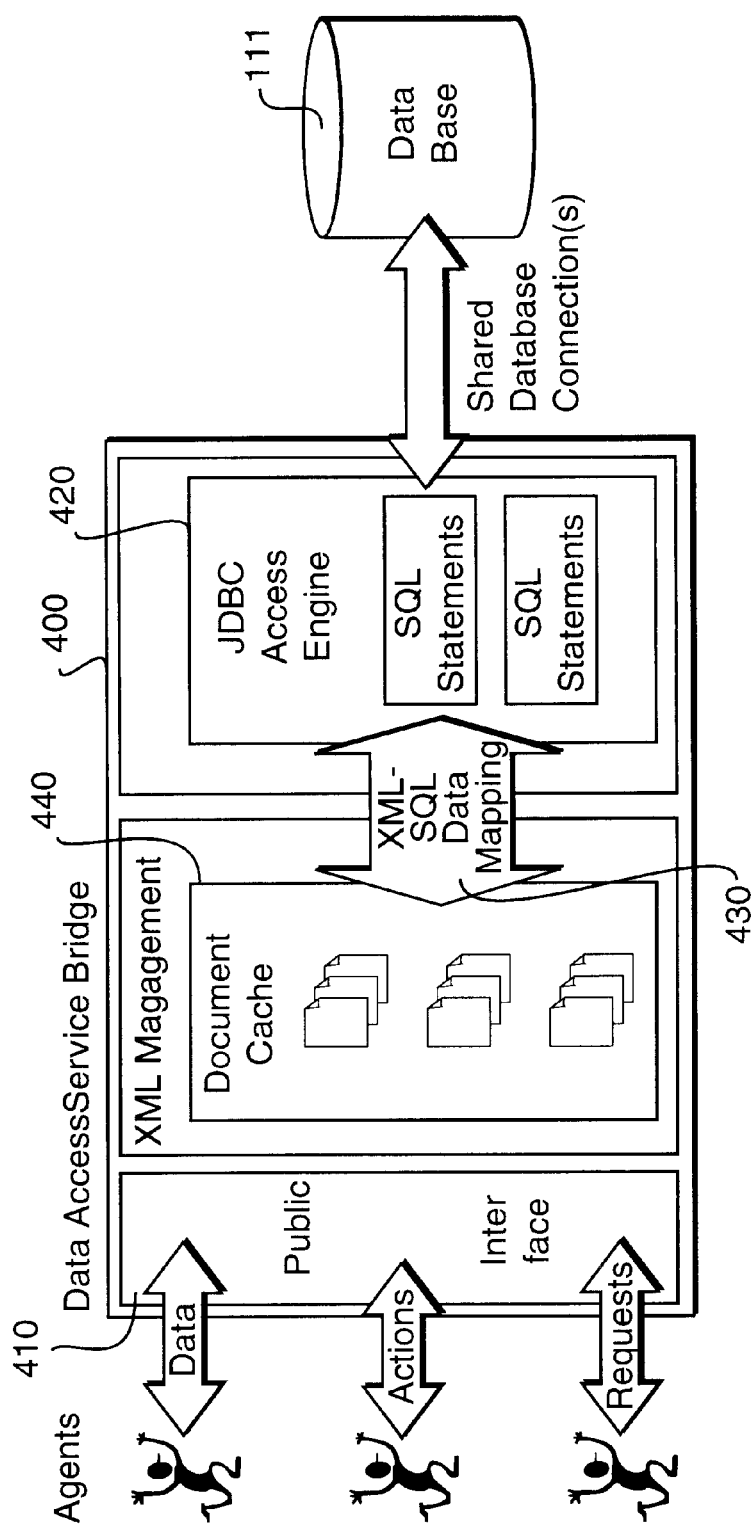
FIG. 4 is a block diagram of a back-end interface of the system of FIG. 1b.

FIG. 4 shows details of a preferred embodiment of a service bridge 400 of the back-end interface 110 for accessing a data source. In this embodiment, JDBC is used to access a SQL type of database. The bridge 400 includes a public interface 410, JDBC run-time access component (RAC) 420, XML-SQL data mapping 430, and a document cache 440 as its main components.

Public Interface

As stated above, the public interface 410 provides the means by which agents access the data sources 111. The public interface allows data retrieval, modification, and addition. As an advantage, the public interface 410 makes no assumptions about how data in the legacy database 111 is sourced or maintained. Instead, we make the public interface resemble the GET/PUT model of HTTP.

JDBC Run-Time Access Component

The JDBC access component 420 is responsible for establishing and managing JDBC connections, building and executing SQL statements, and traversing result sets. This component works entirely within the context of JDBC and SQL.

XML-SQL Data Mapping

The XML-SQL data mapping 430 uses the mapping information generated by the design tools 140 to map data between XML and SQL.

Document Cache

The document cache 440 operates entirely with XML documents. XML documents that have been retrieved from the data source can be cached for fast future retrieval. The caching services are configurable so that maximum cache sizes and cache item expiration times can be specified. Caching can be disabled for certain classes of documents which contain highly volatile information.

Figure 5:
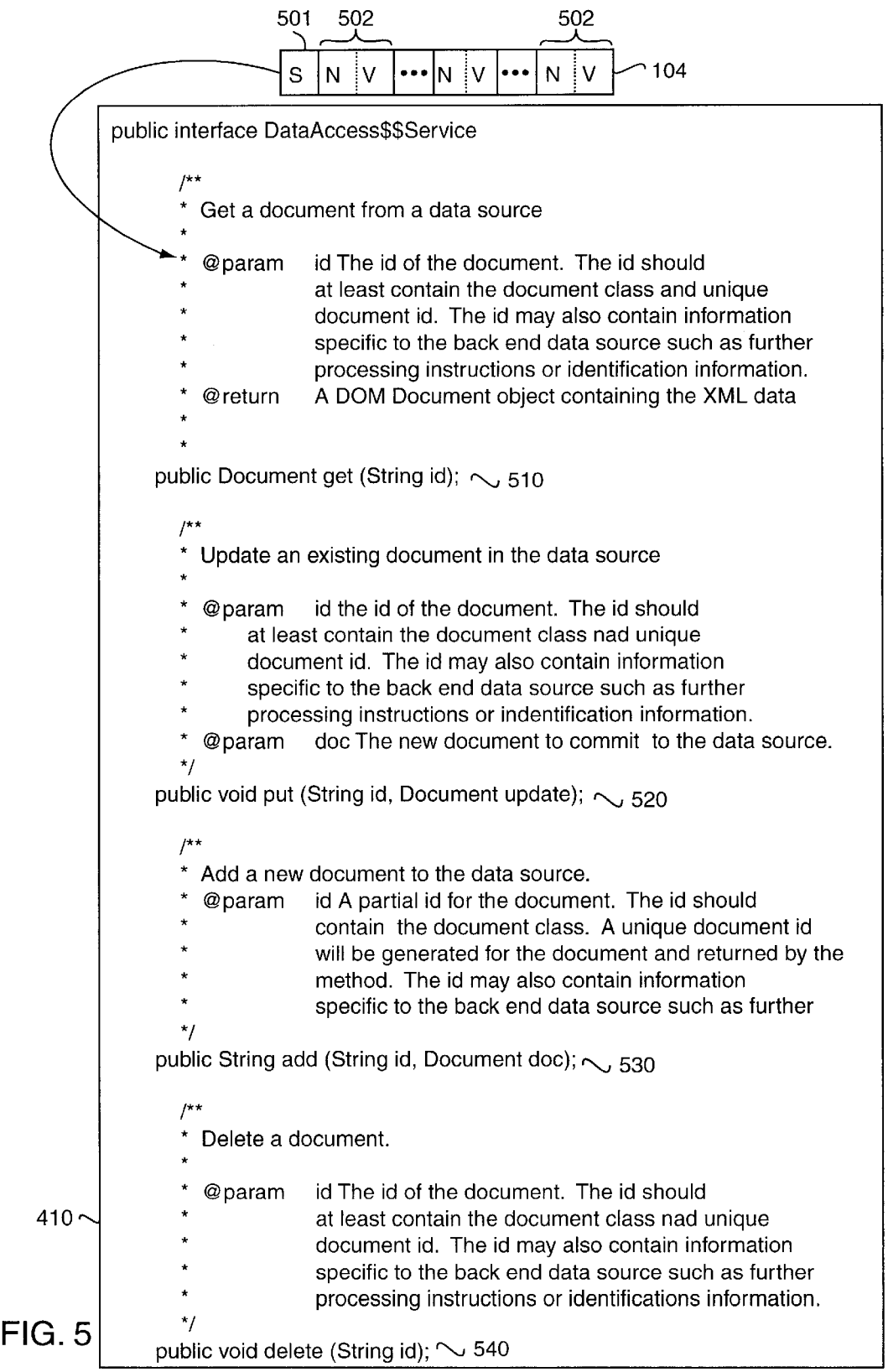
FIG. 5 is a diagrammatic of a public interface of the back-end interface of FIG. 4.

FIG. 5 shows the public interface 410 in greater detail. The interface supports four basic types of accesses, namely get 510, put 520, add 530, and delete 540.

At the heart of the interface is the document id 104. The document id is a string which uniquely identifies every document instance within the data source. The document id can be thought of as corresponding to the URL of a World Wide Web document, or to the primary key of a record in a database. Although the id has a different format than a URL, it does serve as a document locator.

In order to interact with information in the legacy data source, an agent needs to provide the id for the document containing the information. The id contains multiple sections of information and follows the following pattern.

The first character of the id string specifies a separator character (S) 501 that is used to separate the different sections that make up the document id, e.g., a colon (:). This character is used in conjunction with a Java StringTokenizer to parse the document id. The subsequent information in the id includes name=value pairs (N, V) 502. One pairs 502 specifies a document type, e.g., ":type=cust_list:"

In most common cases, the id 104 also contains a key specifying the exact document instance in order to uniquely identify an individual document in a data source. For example, in a document containing customer information, this key contains a data source specific customer number or a customer id. Within the service bridge, this key is mapped to a WHERE clause of a SQL statement. For example, an agent can request customer information for a particular customer by specifying an id string as follows:

":type=customer:key=SMITH:".

This request results in a SQL query to the database that appears as follows:

SELECT * FROM Customers WHERE Customers.ID=SMITH

The exact semantics of how they key is mapped into the resultant SQL statement is specified by the design tools 140.

The key portion of the id can be composed of multiple pieces of information separated by, for example, commas. Such a key is used in cases in which the WHERE clause of the corresponding SQL query needs multiple pieces of information to be specified by the agent. An example of this is a document containing a list of customers, where the customers names are within a certain alphabetic range, for example, "all customers whose last names begin with the letters A or B. Such a document has an id as follows:

":type=cust_list_by_name:key=A,Bzzzz:"

In this case, the request would map into a SQL statement resembling the following:

SELECT * FROM Customers
WHERE Customers.LastName BETWEEN A, Bzzzz

Implementation Details of the Service Bridge

Database Access

User Authentication

The service bridge is responsible for performing any authentication necessary in order to establish a database connection. This may involve supplying a database specific username and password or other login information. When a database access (get, put, add, delete) is made by an agent, the bridge examines the agent's runtime context to determine the user identity associated with the agent.

After the agent's identity has been ascertained, the service bridge maps the identity into simultaneous database-specific user identification using a mapping table generated by the design tools. For example, the mapping maps the user identity "steve@accounting" into an Oracle username "steve."

In order to establish a connection to a database on behalf of a user, the service bridge retrieves both the username and clear-text password for the corresponding database user account. In such cases, the clear-text password is stored in the identity-mapping table. For security reasons, the table is encrypted on disk using a public/private key pair.

Connection Management

To enhance performance and scalability, the service bridge supports database connection pools. This means that multiple users share a common pool of JDBC connections. Establishing a database connection can be a slow and relatively expensive.operation. The use of shared connection pools decreases this expense.

The basis for this connection sharing are "users groups." When an agent attempts an operation which requires a connection to a database, the service bridge performs that operation using a connection established in the context of a special "pseudo-user" account. The pseudo-user is a database system account that represents not an individual user, but instead a particular group of users. A pool of such pseudo-user connections is available for use by all of the agents of the group. The service bridge generates and maintains a connection pool for each distinct group of users who access the bridge.

Figure 6:
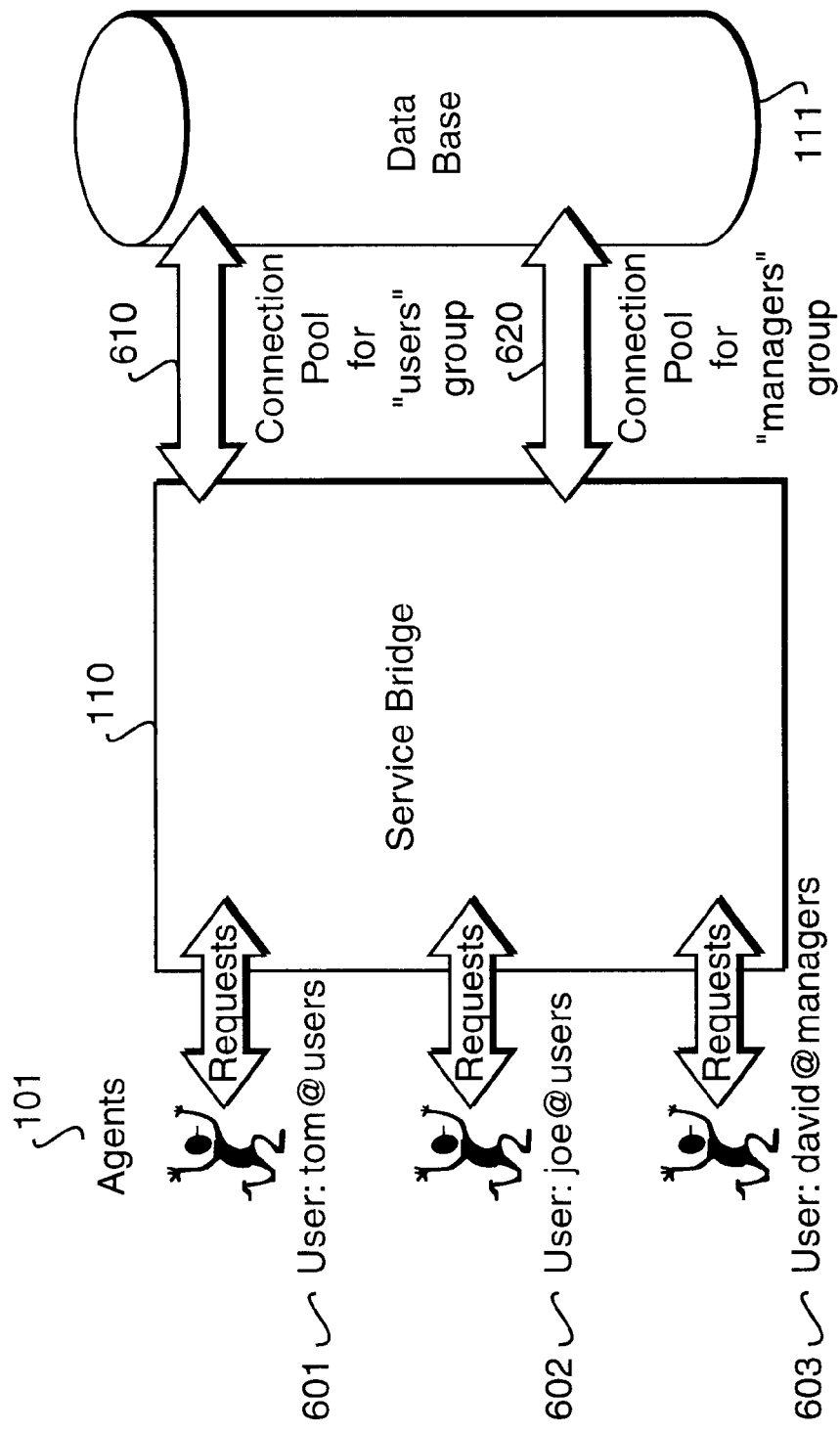
FIG. 6 is a block diagram of pooled connections.

FIG. 6 shows agents 101 for three users tom, joe and david 601–603 accessing the data source 111. Two of the users, tom@users and joe@users, are members of a users group. The third user, david@managers, is a member of a "managers" group. When these agents attempt to access the database, the two members of the users group share a connection pool 610 that was established with the.credentials of the "users" pseudo-user. The third agent will communicate with the database using a separate connection pool 620 established with the credentials of the "managers" pseudo-user.

A connection pool for a particular group is generated when a member of the group makes the first access request. Connections within the pool are constructed as needed. The service bridge does not pre-allocate connections. After a configurable, and perhaps long period of inactivity, the connection pool is closed to free database resources. If a connection pool for a particular group has been closed due to inactivity, then any subsequent request by a member of that group results in the generation of a new pool. When a request is completed, the connection allocated for that request is returned to the pool. A maximum number of connections in a pool can be specified. If no connections are available when a request is made, then the request is blocked until a connection becomes available.

Statement Construction and Execution

The actual generation and execution of SQL statements is performed by a separate "modeler" object. The modeler object is generated by the design tools 140. For each type of document used in the system, there is a distinct modeler object. Each modeler knows how to construct exactly one type of document. During the design process, one specifies what information is to be retrieved from the database, and how to map the information into an XML document. The design tools serialize and save the modeler objects in a ".ser" file. At runtime, the service bridge loads and de-serializes the modeler objects from the ".ser" file. The resultant modeler objects are able to perform all of the data access and mapping functions required to retrieve information from the data sources. As stated above, SQL to XML data mapping is performed by the modeler object designed for a particular document type.

Data Caching

To improve the performance of document retrieval, the data service caches database information as converted XML documents. When a first request is made to retrieve a document, the service performs the SQL access and SQL to XML data mapping as described above. The resultant XML document is added to the cache of documents 440 maintained by the service bridge. Any subsequent request to retrieve the document will be satisfied by retrieving the document from the cache, bypassing the need for an additional expensive database access and mapping.

When an update or addition is made to a data source, the cache is updated to reflect the new information. The update to the cache is made only after the SQL statement performing the update of the end database has been completed successfully. This prevents the cache from storing information that has not been committed to the database due to errors or to security restrictions.

The XML document cache is configurable to specify a maximum size of the cache, the maximum amount of time a single document can be retained in the cache before it becomes stale, and whether the cache should be persisted to disk, in which case the cache can be re-used after a server restart. One can also customize how different classes of documents are cached. If a document represents highly volatile information, then caching can be disabled for that class of document. If a document class is completely (or virtually) static, then documents of that class can be cached for a very long time.

Execution Flow

Figure 7:
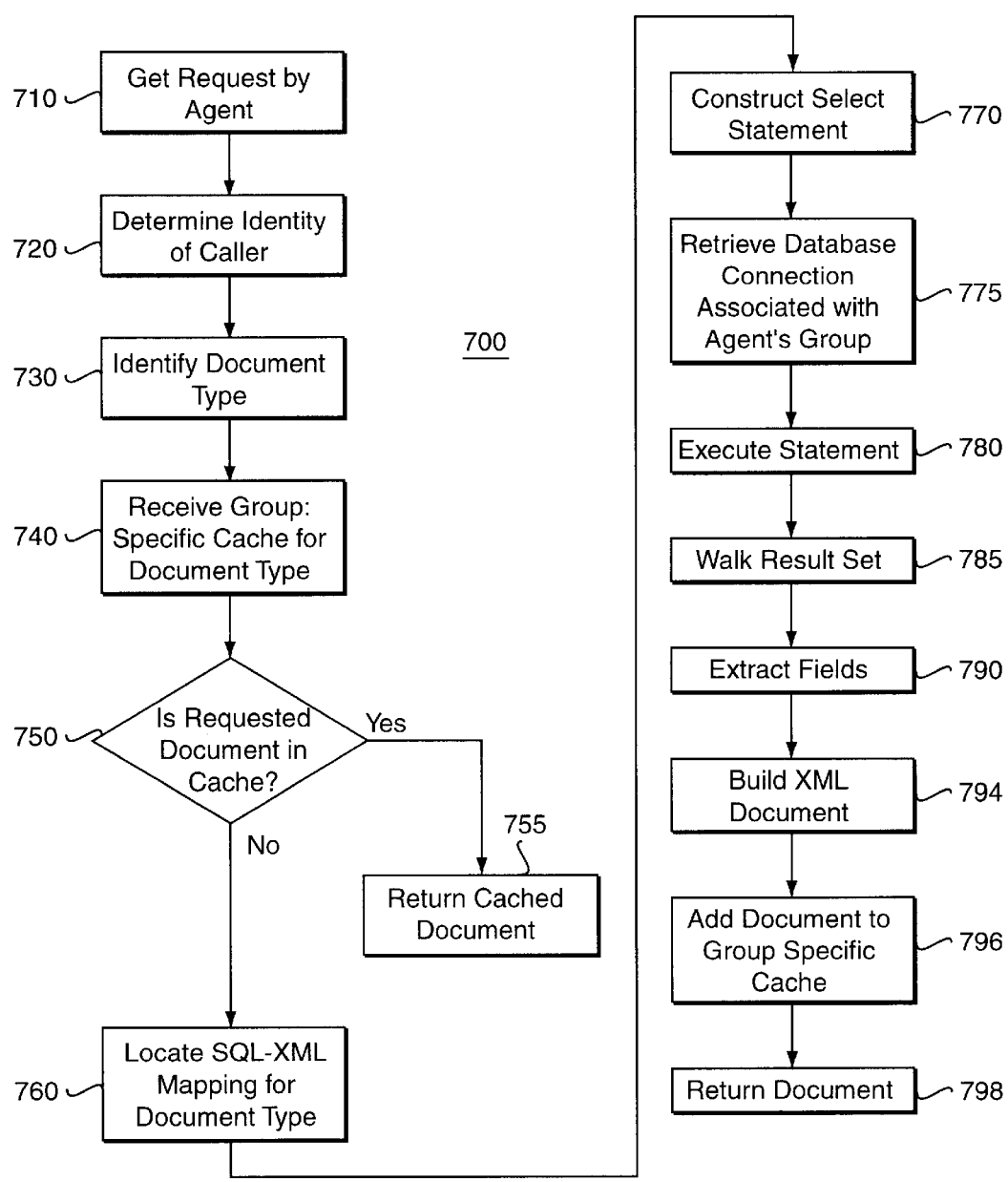
FIG. 7 is a flow diagram of a get request.
Figure 8:
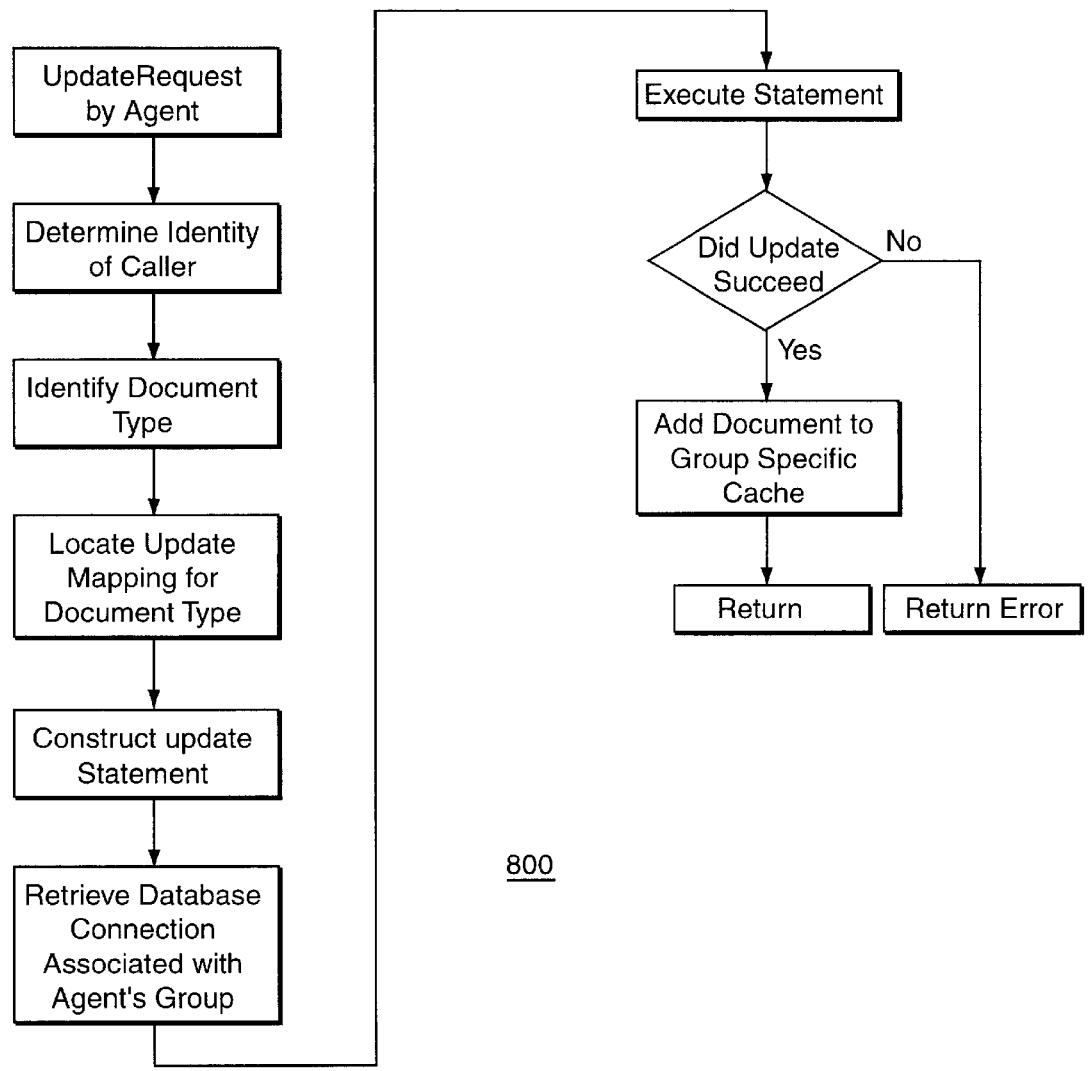
FIG. 8 is a flow diagram of an update request.

The following section describes the execution flow for basic database access requests. FIG. 7 shows the steps 700 of a "get" or retrieval access in greater detail. After the request is received from the agent 710, the caller and document identity are determined 720, 730. The group specific cache is identified 740, and the cache is checked 750. If the cache stores the document, return the document in step 755. Otherwise, locate the XML-SQL mapping 760, construct the select SQL select statement 770, retrieve the connection 775, and execute the statement in step 780. Next, the result set is "walked" 785, fields are extracted 790 to build the XML document 794, the document is cached 796 and returned to the agent in step 798. FIG. 8 shows the steps 800 for the addition (add) and modification (put) similar to the get steps. The delete request simply deletes data from the database as shown at 540 in FIG. 5.

Run-time Object Hierarchy

Figure 9:
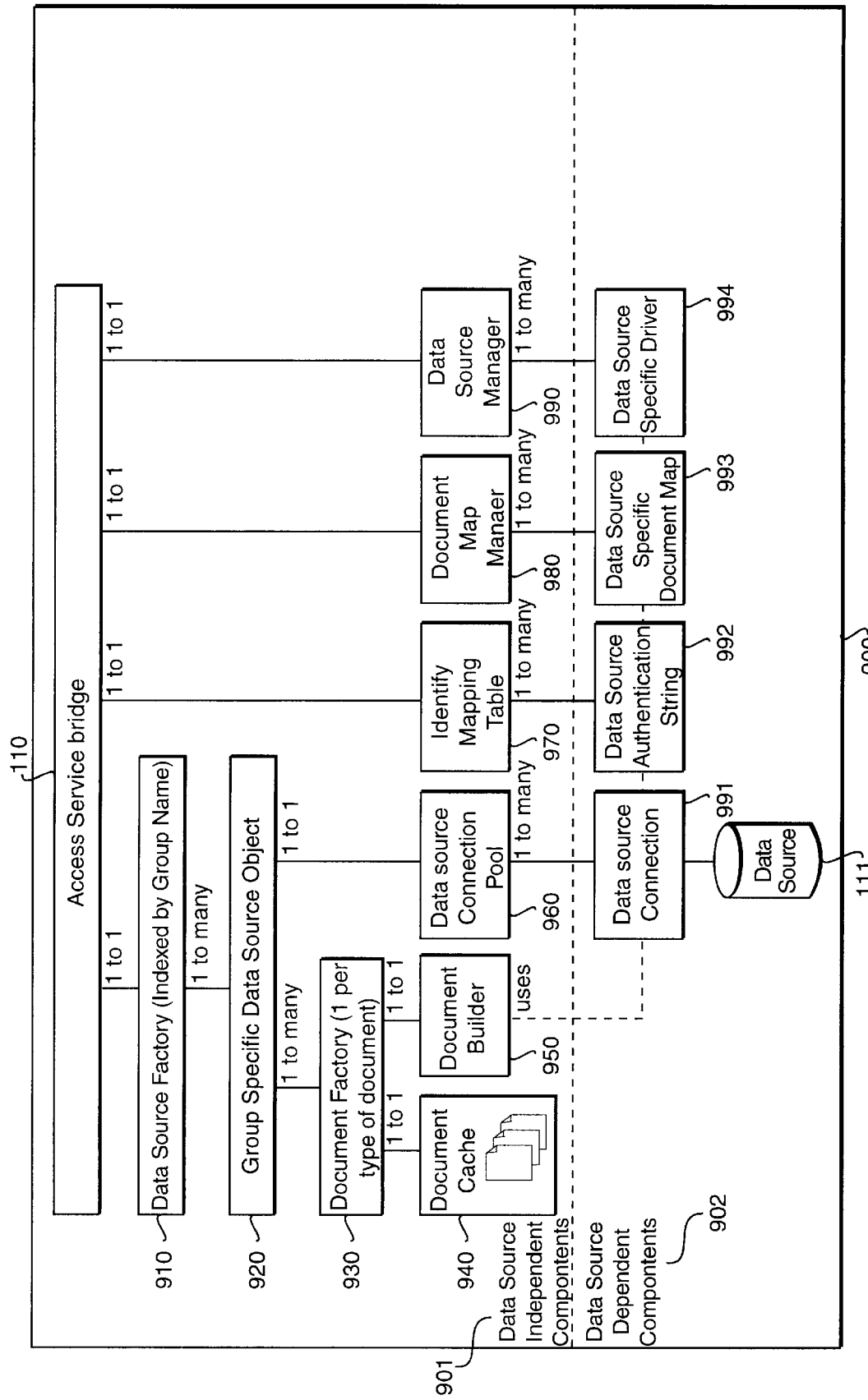
FIG. 9 is a block diagram of an object of service bridge objects.

FIG. 9 shows the run-time hierarchy 900 of objects of the service bridge 110. The objects can be classified as data source independent 901, and data source dependent 902. The data source independent object 901 includes data source factory object 910 indexed by group name, group specific data source objects 920, document factory objects 930 (one per document), document cache objects 940, document builder objects 950, connection pool objects 960, mapping table objects 970, document manager objects 980, and the data source manager objects 990. The data source dependent object 902 include source connection 991, string authentication 992, document map 993, and specific driver objects 994.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. An enterprise integration system, comprising:
    a back-end interface, coupled to a plurality of data sources, configured to convert input data source information to input XML documents and to convert output XML documents to output data source information, wherein the plurality of data sources use different data formats and different access methods;
    a front-end interface including means for converting the input XML documents to input HTML forms and for converting output HTML forms to the output XML documents;
    a middle tier including a rules engine and a rules database;
    design tools for defining the conversion and the XML documents;
    a network coupling the back-end interface, the front-end interface, the middle tier, the design tools, and the data sources;
    a plurality of mobile agents configured to communicate the XML documents over the network and to process the XML documents according to the rules.

2. The system of claim 1 wherein each XML document is identified by a document identification.

3. The system of claim 2 wherein the document identification is a character string.

4. The system of claim 3 wherein the character string includes a plurality of sections, and a first character of the string is a section separator.

5. The system of claim 4 wherein one of the sections stores a document type.

6. The system of claim 3 wherein one of the sections stores a key to an instance of the XML document in one of the data sources.

7. The system of claim 1 wherein the back-end interface further comprises:
    a public interface;
    a document cache; and
    a run-time access component.

8. The system of claim 7 wherein the run-time access component generates access requests for the plurality of data sources.

9. The system of claim 8 wherein the access requests include query, update, delete, add, browse, and search.

10. The system of claim 7 wherein the public interface forwards the input XML document to the plurality of the mobile agents for distribution, and the public interface receives the output XML documents for storing in the plurality of data sources.

11. The system of claim 7 wherein the document cache includes caching parameters.

12. The system of claim 7 wherein the caching parameters include a maximum lifetime for each cache entries, a maximum cache size, and a persistency indicator.

13. The system of claim 1 wherein the XML documents include binary data.

14. The system of claim 13 wherein the binary data is embedded as a compound document.

15. The system of claim 14 wherein the compound document embeds the binary data as an encoding in a character set.

16. The system of claim 14 wherein the compound document embeds the binary as a MIME document.

17. The system of claim 13 wherein the binary data is referenced by a Universal Resource Locator.

18. The system of claim 1 wherein the input documents are presented to a browser.

19. The system of claim 1 wherein the back-end interface performs user authentication.

20. The system of claim 1 wherein the back-end interface supports database connection pools.

21. A method for integrating a plurality of data sources, comprising:
    converting input data source information to input XML documents and converting output XML documents to output data source information, wherein the plurality of data sources use different data formats and different access methods;
    converting the input XML documents to input HTML forms and converting output HTML forms to the output XML documents;
    providing a rules engine and a rules database;
    defining the converting and the XML documents;
    communicating the XML documents over a network using mobile agents; and
    processing the XML documents by the mobile agents according to the rules database.

* * * * *